United States Patent [19]

Hewett et al.

[11] Patent Number: 5,961,855
[45] Date of Patent: Oct. 5, 1999

[54] LOW VOLTAGE ELECTRICAL BASED PARTS-IN-PLACE (PIP) SYSTEM FOR CONTACT START TORCH

[75] Inventors: Roger W. Hewett, Enfield, N.H.; Murray Michaels, Corinth, Vt.

[73] Assignee: Thermal Dynamics Corporation, West Lebanon, N.H.

[21] Appl. No.: 09/014,491

[22] Filed: Jan. 28, 1998

[51] Int. Cl.$^6$ ............................................. B23K 9/00
[52] U.S. Cl. ............................ 219/121.39; 219/121.54
[58] Field of Search ..................... 219/121.39, 121.57, 219/130.4, 505, 121.54, 121.36, 121.29; 204/192.12

[56] References Cited

U.S. PATENT DOCUMENTS

| | | | |
|---|---|---|---|
| 3,745,321 | 7/1973 | Shapiro et al. | 219/121.36 |
| 4,225,769 | 9/1980 | Wilkins | 219/130.4 |
| 4,272,671 | 6/1981 | Hukagawa et al. | 219/505 |
| 4,330,700 | 5/1982 | Jagieniak et al. | 219/121 PP |
| 4,585,921 | 4/1986 | Wilkins et al. | 219/121.54 |
| 4,692,582 | 9/1987 | Marhic | 219/121.54 |
| 4,814,577 | 3/1989 | Dallavalle et al. | 219/121.57 |
| 4,929,811 | 5/1990 | Blankenship | 219/121.54 |
| 4,987,285 | 1/1991 | Dallavalle et al. | 219/121.54 |
| 5,170,030 | 12/1992 | Solley et al. | 219/121.54 |
| 5,584,972 | 12/1996 | Lantsman | 204/192.12 |

*Primary Examiner*—Teresa Walberg
*Assistant Examiner*—Quang Van
*Attorney, Agent, or Firm*—Senniger, Powers, Leavitt & Roedel

[57] ABSTRACT

A detection system for a cutting torch for use in connection with a workpiece. The detection system has an electrode and a tip. A housing supporting the tip and the electrode provides relative movement therebetween and allows electrical contact between the tip and the electrode. A sensor circuit senses when the electrode and the tip are in electrical contact. The sensor circuit generates a switch control signal when the electrode and tip are in electrical contact. A power supply provides a first voltage and a second voltage such that a potential voltage difference is established between the electrode and the and/or workpiece. A magnitude of the first voltage is less than a magnitude of the second voltage. A first switch selectively provides the second voltage to the electrode in response to the switch control signal whereby the potential voltage difference between the electrode and the tip and/or workpiece corresponds to the second voltage when the switch control signal indicates that the electrode and tip are in electrical contact.

15 Claims, 6 Drawing Sheets

LOW VOLTAGE ELECTRICAL BASED PARTS-IN-PLACE (PIP) SYSTEM FOR CONTACT START TORCH

BACKGROUND OF THE INVENTION

Plasma-arc torches, also known as electric arc torches, are commonly used for cutting, welding and spray bonding and operate by directing a plasma consisting of ionized gas particles toward a workpiece. In operation of typical plasma-arc torches, a gas to be ionized is supplied to the front end of the torch and flows past an electrode before exiting through an orifice in the torch tip. The electrode has a relatively negative potential and operates as a cathode. The torch tip which is adjacent to the end of the electrode at the front end of the torch, constitutes a relatively positive potential anode. When a sufficiently high voltage is applied to the electrode, an arc is caused to jump the gap between the electrode and the torch tip, thereby heating the gas and causing it to ionize. The ionized gas in the gap is blown out of the torch and appears as a flame that extends externally off the tip. As the torch head or front end is brought down towards the workpiece, the arc jumps or transfers between the electrode and the workpiece because the impedance of the workpiece to ground is lower than the impedance of the torch tip to ground. During this "transferred arc" operation, the workpiece itself serves as the anode.

Plasma-arc torches may be found in both "non-contact start" and "contact start" varieties. In non-contact start torches, the tip and electrode are typically maintained at a fixed physical separation in the torch head. When a high voltage is applied to the electrode (relative to the tip), a pilot arc is established therebetween. As mentioned above, when the torch head is moved toward the workpiece, the arc transfers to the workpiece. By way of contrast, in contact start torches the tip and/or electrode move relative to each other (e.g., along a longitudinal axis of the electrode). For example, the tip may be biased by a spring such that a clearance distance is maintained between the tip and electrode. In order to initiate a pilot arc, the torch operator places the torch head in contact with the work piece with sufficient force to cause the tip to compress the biasing spring thus allowing the tip and electrode to make electrical contact. This electrical contact enables establishment of a pilot arc. As the operator moves the torch head away from the workpiece, the arc is transferred to the workpiece.

Typically, the electrode and torch tip are consumable items, that is they eventually need replacement. As such, the torch head allows for removal and replacement of both the tip and electrode. Further, it is undesirable to operate a plasma-arc torch when either the tip or electrode is not properly installed. Therefore, plasma-arc torches can benefit from parts-in-place detection circuits for determining whether the tip and/or electrode are properly installed. In non-contact start torches these detection circuits may include a circuit for sensing tip installation, electrode installation, and that the tip and electrode are not in electrical contact. However, the same parts-in-place system used for a non-contact start torch may not work for contact start torches because in a contact start torch, electrical contact between the tip and electrode is necessary during pilot arc initiation.

Moreover, conventional plasma torch parts-in-place detection systems typically use additional electrical or mechanical means, such as contact pins, microswitches and the like, within the torch head or torch leads. This, of course, increases the cost and complicates the design and manufacture of the torch and lead assembly. Further, conventional plasma torches require a relatively high open circuit voltage (e.g., −300 VDC) at the electrode in order to ionize the flowing gas. If the tip were not installed, the electrode would be exposed. An exposed electrode with such a high voltage potential presents an undesirable condition.

There is a need, therefore, for a low cost parts-in-place detection system for use with a contact start plasma-arc torch that requires no additional electrical or mechanical means or wiring within the torch head or torch leads. There is a further need to accomplish the parts-in-place function using a relatively low open circuit voltage rather than the full output voltage otherwise used for normal torch operations.

SUMMARY OF THE INVENTION

It is an object of the invention to provide a low cost, highly reliable parts-in-place detection system for use with a contact start plasma-arc torch. It is another object of the invention to provide a parts-in-place detection system for use with a contact start plasma-arc torch that requires no additional parts in the torch head. It is still another object of the invention to provide a parts-in-place detection system for use with a contact start plasma-arc torch that requires no additional parts in the torch leads. It is a further object of the invention to provide a parts-in-place detection system for use with a contact start plasma-arc torch that uses a relatively low voltage for accomplishing the parts-in-place detection function. It is yet another object of the invention to provide a contact start plasma-arc torch that does not apply a high voltage to the torch electrode when either the tip or electrode are not installed. It is another object of the invention to provide a contact start plasma-arc torch that locks out a high voltage applied to the torch electrode when the voltage exceeds a threshold. It is a further object of the invention to provide a contact start plasma-arc torch that locks out a high voltage applied to the torch electrode when the voltage is below a threshold.

The invention comprises a detection system for a cutting torch for use in connection with a workpiece. The detection system comprises an electrode and a tip. A housing supporting the tip and the electrode provides relative movement therebetween and allows electrical contact between the tip and the electrode. A sensor circuit senses when the electrode and the tip are in electrical contact. The sensor circuit generates a switch control signal when the electrode and tip are in electrical contact. A power supply provides a first voltage and a second voltage such that a potential voltage difference is established between the electrode and the tip and/or workpiece. A magnitude of the first voltage is less than a magnitude of the second voltage. A first switch selectively provides the second voltage to the electrode in response to the switch control signal whereby the potential voltage difference between the electrode and the tip and/or workpiece corresponds to the second voltage when the switch control signal indicates that the electrode and tip are in electrical contact.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION OF PREFERRED EMBODIMENTS

Figure 1:
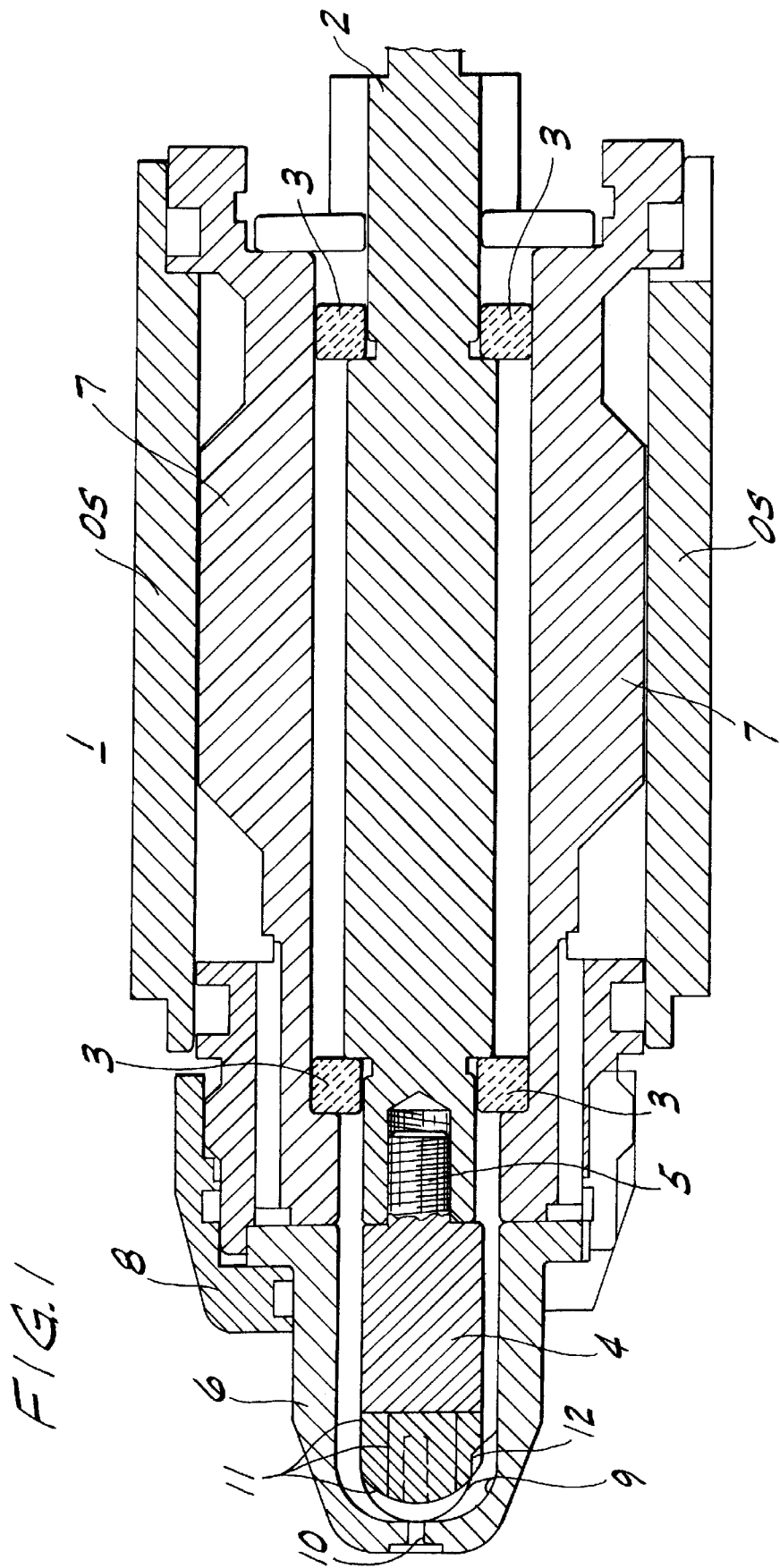
FIG. 1 is a cross-sectional view of a rotational contact start torch head 1 for use with the parts-inplace detection system of the present invention.

FIG. 1 is a cross-sectional view of a rotational contact start torch head 1 suitable for use with the parts-in-place detection system of the present invention. A cylindrical cathode 2 is disposed along a center axis of torch head 1. A pair of ceramic rings 3 electrically isolate the cathode 2 from an anode 7 that is disposed coaxial with the cathode 2. An outer sleeve OS surrounds the torch head assembly 1 and acts as a thermal and electrical insulator.

An electrode 4 is attached to an end of cathode 2. Electrode 4 may be attached to cathode 2 by screw means 5 or otherwise, such as a ramping cam lock. A torch tip 6 is attached to the anode 7 and held in place by a tip retainer 8. The torch tip 6 has an inner surface 9 having an ellipsoid shape and an orifice 10. The electrode 4 has an outer surface 11, the shape of which corresponds to the shape of the tip inner surface 9. Electrode 4 is rotatable about its longitudinal axis. When the electrode 4 is in a rotated position (e.g., 90°), outer surface 11 makes electrical contact with inner surface 9. When the electrode 4 is in a nonrotated position, the outer surface 11 of the electrode 4 does not make contact with the inner surface 9 of the tip 6. Area 12 represents a side view of the electrode 4 when it is in a rotated position (e.g., 90°) and surface 11 is in contact with inner surface 9.

The anode 7 is connected to ground (typically through a small resistance such as 0.5Ω). Torch tip 6 is in electrical contact with the anode 7, and, hence, also comprises part of the anode. Electrode 4 is electrically connected to cathode 2, which, in turn, is connected to a power source. Thus, a potential voltage difference is established between the electrode 4 and the tip 6. Depression of a torch switch (not shown) by the operator causes the assembly comprising the cathode 2 and electrode 4 to rotate relative to the anode 7. This rotation allows the outer surface 11 of electrode 4 to make electrical contact with the inner surface 9 of torch tip 6. Area 12 illustrates how the outer surface 11 of electrode 4 makes contact with the inner surface 9 of tip 6. The rotation mechanism (not shown) is biased such that after electrode 4 rotates and makes contact with tip 6, the electrode 4 returns to its prior nonrotated or steady-state (operating) position in which there is no contact between electrode 4 and tip 6. Those skilled in the art will recognize that this rotatable cathode contact start torch head advantageously allows for pilot arcing both in the air and in contact with a workpiece.

As has been shown, therefore, anode 7 comprises part of a housing that supports the tip 6 and electrode 4 and provides for relative movement therebetween, thus allowing for electrical contact between tip 6 and electrode 4.

The outer sleeve OS and ceramic rings 3 are constructed of a suitable nonconductive insulating material. The remaining parts of the torch head assembly described above are typically constructed from various types of metallic and/or electrically conductive material.

Those skilled in the art will also recognize that there are other ways to construct a contact start torch head. For example, rather than using a rotatable cathode/electrode assembly ("rotational torch"), a stationary electrode/cathode can be used in conjunction with a spring biased tip ("axial torch"). In such a torch, the tip and electrode are brought into contact by pressing the torch head against the workpiece, thus compressing the spring.

Figure 2:
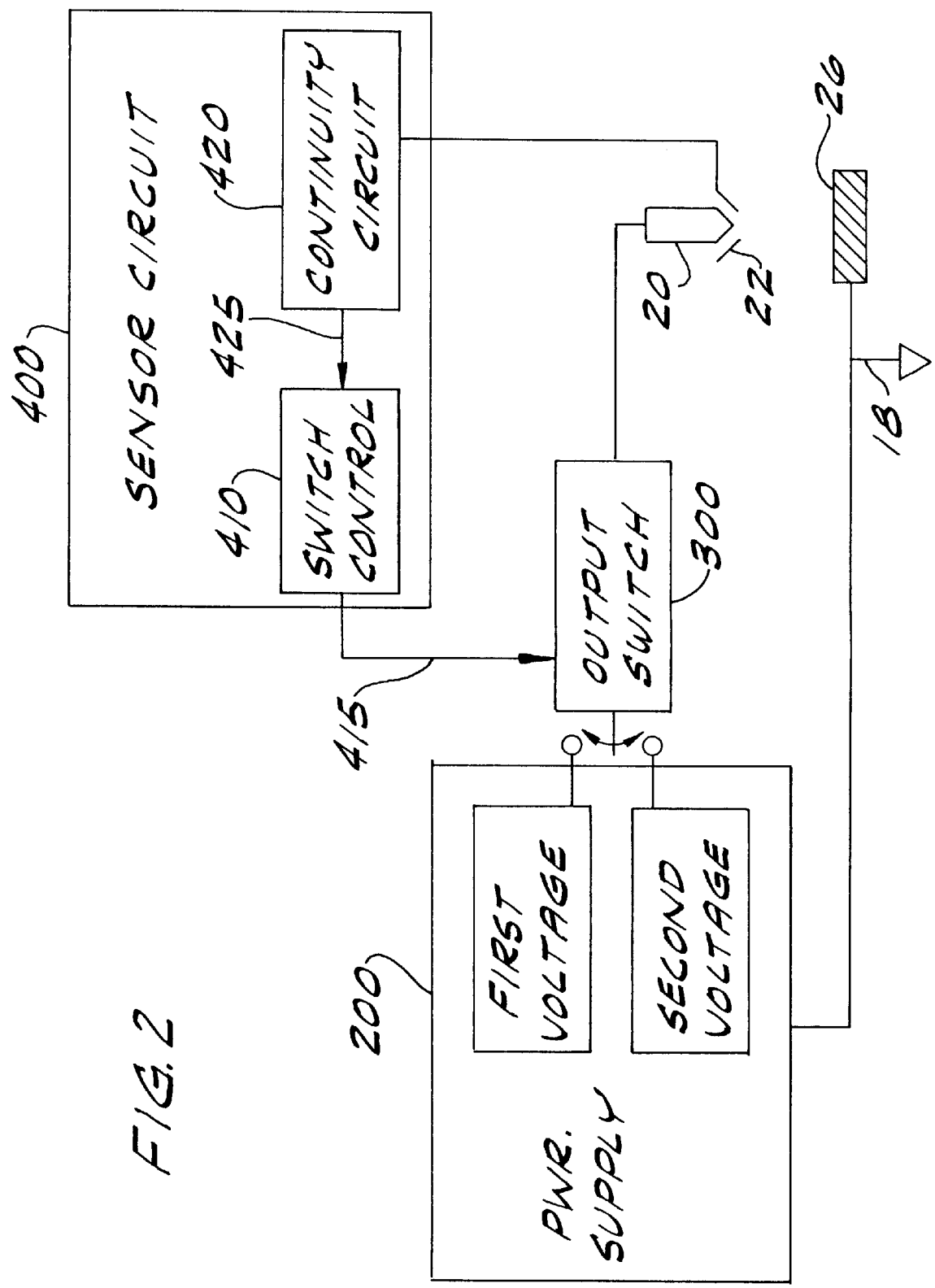
FIG. 2 is a block diagram of one preferred embodiment of a parts-in-place detection system according to the invention for use with a contact start torch.

FIG. 2 is a block diagram of a preferred embodiment of a low voltage parts-in-place detection system according to the present invention, suitable for use with a contact start torch. A power supply 200, having first and second voltage outputs, is connected to a torch electrode 20 via output switch 300. A sensor circuit 400 comprises a switch control circuit 410 and a continuity circuit 420. The continuity circuit 420 is connected to a torch tip 22 and outputs a parts-in-place signal 425 to switch control circuit 410. The switch control circuit 410 is connected to the continuity circuit 420 and outputs a switch control signal 415. The switch control signal 415 is connected to the output switch 300. The electrode 20 and tip 22 are supported in a housing (not shown) that provides for relative movement between the electrode 20 and tip 22.

In operation, power supply 200 provides a DC voltage to the electrode 20 such that a potential voltage difference is established between electrode 20 and the tip 22 and/or workpiece 26. The power supply 200 has first and second output voltages, with a magnitude of the first voltage being less than a magnitude of the second voltage. While not illustrated in FIG. 2, the torch of the present invention typically uses a positive ground/common reference point 18. In other words, the torch uses negative voltages such that the first voltage is less negative than the second voltage of power supply 200.

The output of power supply 200 is connected to electrode 20 via output switch 300. When a torch switch (not shown) is activated by a torch operator, output switch 300 is set such that the first voltage (low voltage) output is connected to electrode 20. In order to initiate a pilot arc, the electrode 20 and tip 22 must make electrical contact. This contact can be made as described above with regard to FIG. 1, or otherwise depending upon specific torch head construction. Sensor circuit 400 senses this electrical contact and outputs the switch control signal 415 to output switch 300. Upon receipt of switch control signal 415, output switch 300 switches the output of power supply 200 from the first voltage (low output) to the second voltage (high output). In this way, the second voltage is provided to electrode 20 and the potential voltage difference between electrode 20 and tip 22 and/or workpiece 26 corresponds to the second voltage. If, however, either the electrode 20 or the tip 22 were missing or improperly installed, the sensor circuit 400 would not sense continuity, and hence, would not provide the switch control signal 415 to output switch 300. In that case, the first voltage would remain applied to electrode 20, thus preventing application of the higher output voltage when the torch parts were not in properly in place.

Sensor circuit 400 further comprises switch control circuit 410 and continuity circuit 420. Continuity circuit 420 senses electrical contact between electrode 20 and tip 22 and provides the parts-in-place signal 425 to switch control circuit 410. That is, if continuity circuit 420 senses electrical continuity between electrode 20 and tip 22, the parts-in-place signal 425 is provided to the switch control circuit 410. Upon receipt of parts-in-place signal 425, switch control circuit 410 asserts switch control signal 415 thereby causing output switch 300 to provide the second voltage to the electrode 20.

Continuity circuit 420 may comprise, for example, a small resistance connected between tip 22 and workpiece 26. Further, for many torch operations (e.g., transferred arc operations), workpiece 26 is connected to ground/common 18. Due to the small resistance, the potential voltage difference between the tip 22 and workpiece 26 is maintained near zero volts. In this way, the potential voltage difference between electrode 20 and workpiece 26 approaches zero volts when the electrode 20 and tip 22 are in electrical contact. Switch control circuit 410 monitors this potential voltage difference between electrode 20 and the tip 22 and/or workpiece 26 via continuity circuit 420 and the parts-in-place signal 425. When this monitored voltage difference approaches zero volts (e.g., the electrode and tip are in electrical contact) the switch control circuit 410 outputs the switch control signal 415 thus indicating that the electrode 20 and tip 22 are properly installed.

Figure 3:
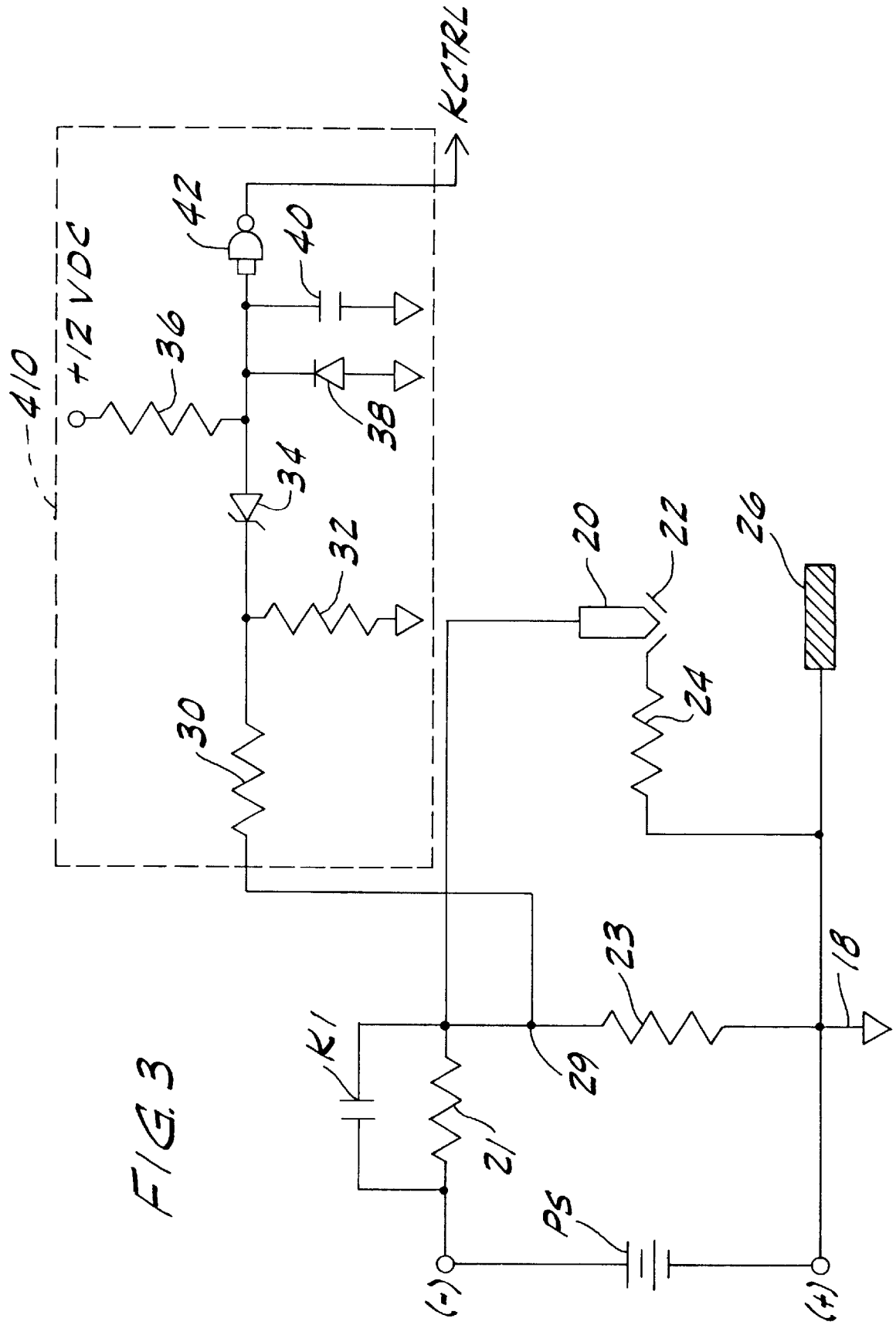
FIG. 3 is a schematic diagram of one preferred embodiment of a parts-in-place detection system according to the invention for use with a contact start torch.

Turning now to FIG. 3, a schematic of one preferred embodiment of a parts-in-place detection system for a contact start torch according to the present invention. A DC power source PS is connected to a voltage divider circuit comprising resistors 21 and 23. A switch K1, preferably a relay, is connected in parallel across resistor 21. The output of the voltage divider circuit is connected to a torch electrode 20 thereby establishing a potential voltage difference between the electrode 20 and the tip 22 and/or workpiece 26. Workpiece 26 is shown connected to positive ground/common 18. A torch tip 22 is connected to the workpiece 26 via a continuity circuit. In FIG. 3, the continuity circuit is depicted as resistor 24 (also called a pilot resistor) which preferably has a low value such as 0.5Ω. In this way, the potential voltage difference between the tip 22 and workpiece 26 approaches zero volts. A switch control circuit 410 is connected to electrode 20. Switch control circuit 410 further comprises a voltage limiter and a logic circuit. In the embodiment shown in FIG. 3, the voltage limiter comprises a voltage divider including resistors 30 and 32, and a zener diode 34 with its cathode connected to the junction of the connection between resistors 30 and 32, and its anode connected to the logic circuit. The logic circuit comprises a resistor 36 connected to the anode of zener diode 34 at one end and pulled up to a positive logic reference (e.g., +12 VDC) at the other end. A diode 38 and capacitor 40 are connected in parallel, with one end connected to the anode of zener 34 and the other end connected to ground. Both inputs of a dual input NAND gate 42 are connected to the anode of zener 34. The output of NAND gate 42 provides a switch control signal KCTRL which controls the operation of switch K1.

In practice, DC power source PS provides a relatively high magnitude open circuit DC voltage (e.g., 300 VDC). In the embodiment shown, power source PS uses a positive ground system—the voltage output applied at node 29 is at a more negative voltage potential than the ground/common reference 18. The output of power source PS is connected to the voltage divider made up of resistors 21 and 23 to provide a first voltage (low output) to electrode 20 such that the potential voltage difference established between electrode 20 and the tip 22 and/or workpiece 26 corresponds to this first voltage. The voltage divider results in the first voltage having a magnitude less than that of power source PS.

Switch K1, responsive to switch control signal KCTRL, is connected across resistor 21. Upon receipt of switch control signal KCTRL, switch K1 closes (conducts) thereby shunting resistor 21 and effectively providing a second voltage (high output) to electrode 20. This second voltage has a magnitude higher than that of the first voltage (the voltage provided when resistor 21 is not shunted by switch K1). Only when this second voltage is connected to electrode 20 is there sufficient power for the torch to cut or weld the workpiece 26.

A housing (not shown) supports electrode 20 and tip 22 and allows for relative movement therebetween. In order to initiate a pilot arc, two conditions must be present: (1) a torch switch (not shown) must be activated by the operator so that power is available to the parts-in-place detection system; and (2) the tip 22 and electrode 20 are placed into electrical contact, thus indicating that the parts are properly in place. When the torch switch is initially depressed, switch control signal KCTRL causes switch K1 to be open circuited (nonconducting) thereby providing the first voltage (low output) to electrode 20. Resistor 24 (pilot resistor) is preferably a small resistance (e.g., 0.5Ω, 50 watt) connected between the torch tip 22 and the workpiece 26. Workpiece 26 is in turn clamped to ground/common 18 for most torch operations. Switch control circuit 410 monitors the voltage at node 29. This monitored voltage reflects the potential voltage difference between electrode 20 and tip 22 and/or workpiece 26. When electrode 20 and tip 22 are in electrical contact, the voltage monitored at node 29 approaches zero volts due to the small value of resistor 24. A voltage at or near zero voltage at node 29 indicates that electrode 20 and tip 22 are properly installed—the parts are in place and it is safe to apply the full output of power source PS to electrode 20.

When node 29 is at or near zero volts, resistors 30 and 32 are essentially connected in parallel. In this mode, pull up resistor 36 causes a logic "high" to be present at both inputs of NAND gate 42. As is well known in the art, a high on both inputs of a NAND gate results in a logic "low" on the output of that gate. Hence, when node 29 is at or near zero volts potential, NAND gate 42 outputs a logic low on switch control signal KCTRL. A logic low on switch control signal KCTRL causes switch K1 to close (conduct) thereby shunting resistor 21 and providing the full output of power source PS to electrode 20. In other words, when switch control circuit 410 senses that electrode 20 and tip 22 have made electrical contact (indicating that the torch parts are in place), switch K1 conducts thereby providing the second voltage (high output) to electrode 20.

As is known in the art of cutting torches, when a transferred arc exists between electrode 20 and workpiece 26, the potential voltage between the electrode and workpiece drops below that of the open circuit voltage of power source PS. If the arc is later extinguished for some reason, the magnitude of the voltage monitored at node 29 will rise toward the magnitude of the open circuit voltage of power source PS. In the embodiment shown in FIG. 3, once switch control signal KCTRL causes switch K1 to close (conduct), K1 remains closed as long as the magnitude of the voltage monitored at node 29 remains less than an upper/high voltage threshold. If the magnitude of the monitored potential voltage difference at node 29 exceeds this high voltage threshold, switch control signal KCTRL causes switch K1 to open (not conduct) thereby switching resistor 21 in line with power source PS. When this occurs, the first voltage (low output) is again provided to electrode 20.

The value of the high voltage threshold may be established by selecting the components of the voltage limiter which, as shown in FIG. 3, comprises resistors 30 and 32 and zener diode 34. For example, the voltage limiter may be configured such that when the magnitude of the voltage sensed at node 29 exceeds approximately 200 VDC, switch control signal KCTRL causes switch K1 to open circuit and remove the second (relatively high) open circuit voltage from electrode 20.

Figure 4A:
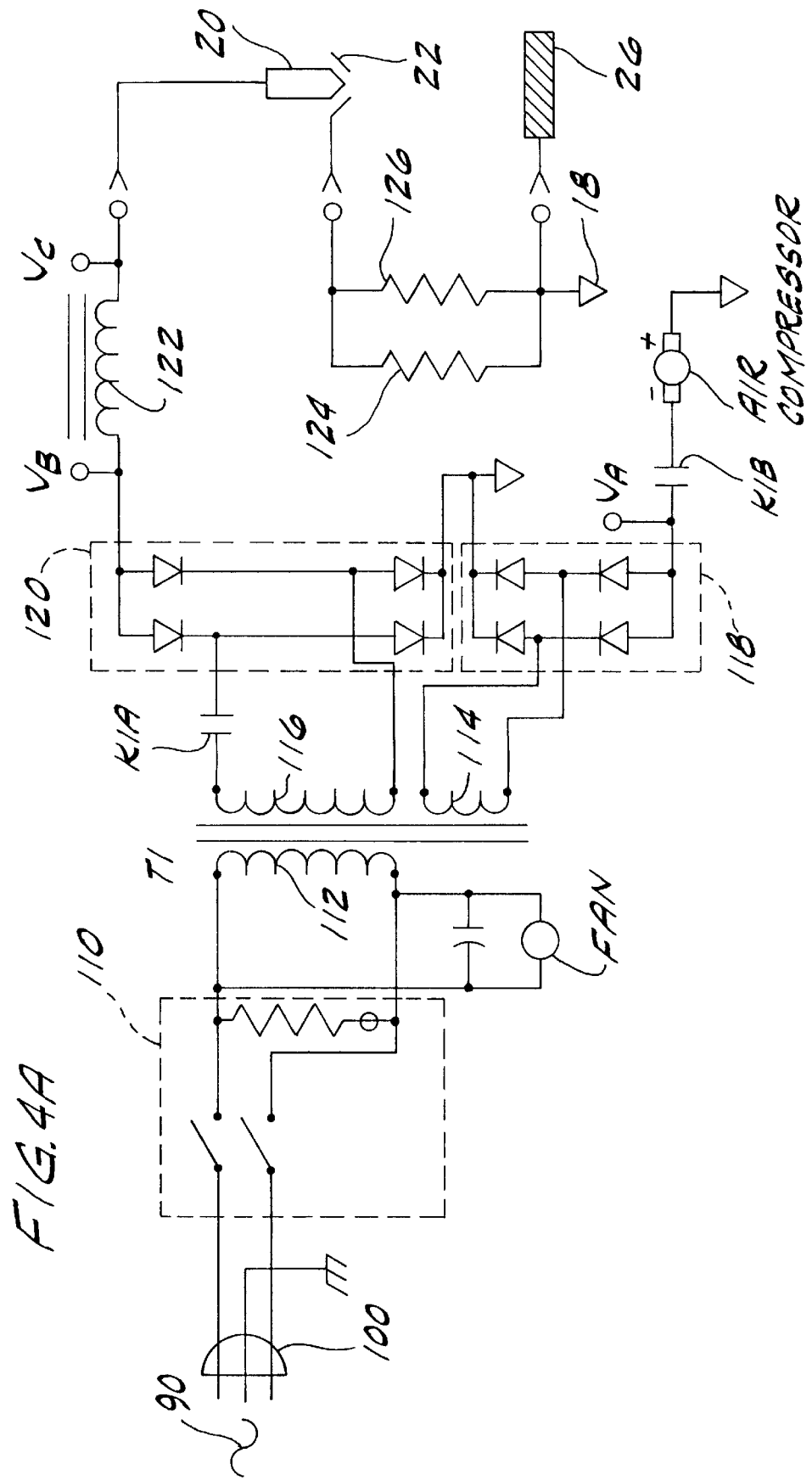
FIG. 4A is a portion of a schematic diagram of a second preferred embodiment of a parts-in-place detection system according to the invention for use with a contact start torch.
Figure 4B:
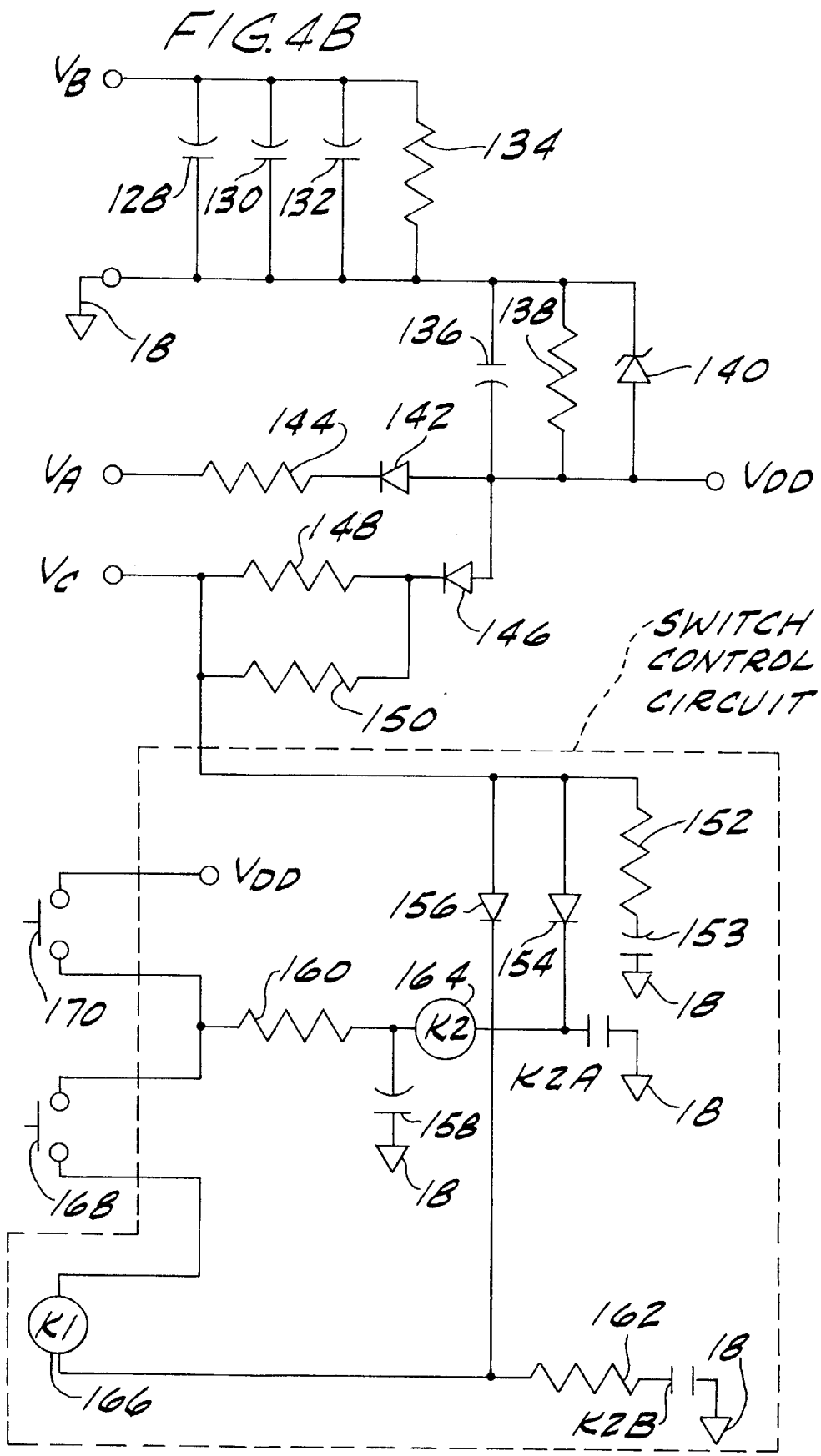
FIG. 4B is another portion of a schematic diagram of a second preferred embodiment of a parts-in-place detection system according to the invention for use with a contact start torch.

Turning now to FIGS. 4A and 4B which show schematics of a second preferred embodiment of a parts-in-place detection system according to the present invention and for use with a contact start torch. In FIG. 4A, AC power 90, such as, for example, 115 VAC, is provided to the torch via AC input 100. AC input 100 is connected to a transformer T1 via power switch 110. Transformer T1 has a primary winding 112, as well as a low voltage secondary 114, and a high voltage secondary 116. The AC voltage appearing across low voltage secondary 114 will be less than the AC voltage appearing across high voltage secondary 116.

Low voltage secondary 114 is connected to a first rectifier bridge 118, the output of which is connected to low voltage DC node VA and switch K1B, which in turn is connected to an air compressor. High voltage secondary 116 is isolated from a second rectifier bridge 120 by a series switch K1A. Switches K1A and K1D are preferably part of a dual relay controlled by a common relay coil (depicted in FIG. 4B as switch K1 control 166). In other words, K1A and K1B, as shown, are either both open (non-conducting) or both closed (conducting), and subject to the same control signal (switch K1 control 166). When switch K1A is closed, high voltage secondary 116 is connected to the second rectifier bridge 120 which results in a high voltage DC source being available at high voltage DC node VB. Node VB is connected to voltage node VC via inductor 122. Node VC is selectively connected to torch electrode 20 to establish a potential voltage difference between electrode 20 and tip 22 and/or workpiece 26. Electrode 20 and torch tip 22 are supported in a housing (not shown) that provides for relative movement between the electrode 20 and tip 22. As such, electrical contact (e.g., continuity) may occur between the tip 22 and the electrode 20. Tip 22 is connected to workpiece 26 via a pair of parallel resistors 124, 126. Resistors 124 and 126 are preferably low value, such as 1Ω, 50 W resistors, thus effectively providing a 0.5Ω connection between tip 22 and workpiece 26. It is expected, and is likewise shown, that for most torch operations workpiece 26 will also be clamped to ground/common.

FIG. 4B is a schematic of the remainder of the parts-in-place detection system according to this second preferred embodiment. Low voltage DC node VA is connected to positive ground/common 18 via resistor 144, diode 142, capacitor 136, resistor 138 and zener diode 140. Zener 140 is connected such that a limited low voltage DC source is provided at node VDD for use in the low voltage parts-in-place detection function. High voltage DC node VB is connected to ground/common 18 via a bank of main output filter capacitors 128, 130, 132, and resistor 134. Voltage node VC is connected to parallel bleeder/bias resistors 148, 150 and the cathode of a diode 146. The anode of diode 146 is connected to limited low voltage DC node VDD. Node VC is also connected to a switch control circuit.

The switch control circuit is responsive to two "external" switches—torch switch 170 and temperature switch 168. Torch switch 170 may be an electromechanical switch responsive to an operator for controlling, among other things, application of power to the parts-in-place detection system. Torch switch 170 inhibits application of power to the detection system when the torch switch 170 is not activated, and does not inhibit application of power when the torch switch 170 is activated. Temperature switch 168, typically a bimetal type thermal switch, is closed if a sensed temperature is below a threshold value. Temperature switch 168 may be used to sense the temperature at critical places within the torch and/or its power supply for example, the temperature at transformer T1 (FIG. 4B).

The switch control circuit further comprises a zener diode 156, the cathode of which is connected to ground/common 18 via resistor 162 and switch K2B. The anode of zener 156 is connected to node VC. A diode 154 has its anode connected to node VC and its cathode connected to ground via switch K2A. Switches K2A and K2B, like switches K1A and K1B, are preferably part of a single relay. That is, switches K2A and K2B are either both open or both closed in response to current flow through the same relay control coil, shown in FIG. 4B as switch K2 control 164.

Node VDD is connected to one side of torch switch 170. When torch switch 170 is closed (conducting), VDD is also connected to ground/common 18 via a resistor 160 and a capacitor 158. The junction of capacitor 158 and resistor 160 is connected to one end of switch K2 control 164. The other end of switch K2 control 164 is connected to the cathode of diode 154 and to ground via switch K2A. When torch switch 170 and temperature switch 168 are both closed, VDD is also connected to switch K1 control 166 which is in turn connected to ground via resistor 162 and switch K2B.

In operation, AC power 90 is provided to a transformer Ti via AC input 100 when power switch 110 is closed. Upon initial power up of the torch, and before torch switch 170 is activated by the operator, switches K1A, K1B, K2A, and K2B are open circuited. The output of the low voltage secondary 114 is rectified by the first rectifier bridge 118 to provide a low voltage DC source at node VA. Capacitor 136 (FIG. 4B) charges through resistor 144 and diode 142. The peak DC voltage across capacitor 136 is limited by zener diode 140 to provide the limited low voltage DC source at node VDD to be used for the low voltage parts-in-place detection function. Zener 140 may chosen to limit VDD to a relative low value such as, for example, −18 VDC.

Before the torch switch 170 is pressed, insufficient current is available to either switch K1 control 166 or switch K2 control 164, hence switches K1A, K1B, K2A, and K2B are all open circuited. Switches K1A and K1B provide power control. That is, they control application of high voltage power to electrode 20, and are selectively operated in response to switch K1 control 166 which is typically a relay coil. When sufficient current flows through switch K1 control 166, switches K1A and K1B close (conduct). Switches K2A and K2B provide a logic control function, in essence selectively controlling operation of power control switches K1A and K1B. Switches K2A and K2B open and close in response to switch K2 control 164, typically a relay coil. When sufficient current flows through switch K2 control 164, switches K2A and K2B close (conduct).

Activation of torch switch 170 by the torch operator connects node VC with the limited low voltage DC source at node VDD through resistor 160, switch K2 control 164, and diode 154. As is shown in FIG. 4A, node VC is also connected to electrode 20. Hence, when the torch switch is initially pressed, the low DC voltage is provided to electrode 20, thereby reducing the risk that might occur if the electrode 20 or tip 22 were not properly in place, and a higher magnitude voltage was applied to electrode 20. At this same time, main output capacitors 128, 130 and 132 charge. Capacitor 158 is placed on the other side of switch K2 control 164 to prevent it from energizing during this time period. If the torch switch 170 is depressed thus causing the electrode 20 and tip 22 to make contact (see discussion of FIG. 1 above), the required action to initiate a pilot arc in a contact start torch, node VC will be brought to essentially ground/common potential through resistors 124 and 126. As previously noted, resistors 124 and 126 preferably have a low value (e.g., 1Ω).

When the voltage applied to node VC is brought to ground/common potential, sufficient energization current flows through switch K2 control 164 causing switches K2A and K2B to close (conduct). If, however, the electrode 20 or tip 22 are not properly in place, node VC will not be brought to ground and insufficient current will flow through switch K2 control 164 to close switches K2A and K2B. In that case, the potential voltage at electrode 20 remains limited by the relatively low magnitude voltage at VDD. In other words, if the parts are not properly in place, only the relatively low voltage is provided to electrode 20—this is the low voltage parts-in-place function.

While the operator continues to depress torch switch 170 and allows the electrode 20 and tip 22 to separate, switches K2A and K2B remain closed (latched on). At the same time, if temperature switch 168 is closed (indicating a proper operating temperature), current flows through switch K1 control 166 to ground via resistor 162 and switch K2B which is now closed. This current flow through switch K1 control 166 causes switches K1A and K1B to close (conduct). In this way, switch K2B selectively controls operation of switches K1A and K1B.

Closure of switch K1B causes an air compressor to start. Closure of switch K1A connects the high voltage secondary 116 to the second rectifier bridge 120 thus establishing a high voltage DC source at node VB. This allows the voltage applied to electrode 20 to ramp up to a value sufficient to cut or pilot with respect to workpiece 26 (e.g., between −80 and −130 VDC). Hence, only after the detection system determines that the tip 22 and electrode 20 are properly in place, is the high voltage DC source provided to electrode 20.

Resistor 144 may be sized to limit the current flow through switch K1 control 166 and switch K2 control 164. However, sufficient hold current (e.g., about 50 mA) must be provided to allow switch K1 control 166 and switch K2 control 164 to remain energized and maintain switches K1A, K1B, K2A, and K2B in the closed state. This additional current is available from node VC via bleeder/bias resistors 148 and 150. By sizing resistors 144, 148 and 150 properly, therefore, a low voltage threshold may be established. That is, if the output voltage at node VC which is provided to electrode 20 is too low/insufficient for proper torch operations (e.g., cutting), switch K1 control 166 and switch K2 control 164 will lack sufficient current, and, as such, switches K1A, K1B, K2A and K2B will open. This can be viewed as an "under voltage lock out" function. An under voltage condition may occur, for example, if there is inadequate air flow in the torch head assembly. Switch K2 control 164, in conjunction with resistor 144 and bleeder/bias resistors 148, 150 comprise a monitor circuit for monitoring the voltage provided to electrode 20. When the magnitude of the monitored voltage fails to achieve a low voltage threshold (e.g., 60 VDC), switch K2 control 164 is deprived of sufficient current to maintain switch K2B in the closed state. When switch K2B is open, switch K1 control 166 is likewise deprived of sufficient current, thereby causing switch K1B to open and remove (lock out) application of the high voltage DC source from electrode 20.

Note that capacitor 136 should be sized large enough (e.g., 3,300 μF, 25 V) to allow sufficient time for the monitored output voltage applied to electrode 20 to ramp up, without triggering the under voltage lock out function just described. Note also, that once the switches K1B and K2B drop out, they cannot be reenergized while torch switch 170 is pressed due to the current limiting action of resistor 144. In short, the torch switch 170 must be cycled (released and then depressed) in order to attempt to restart the pilot process after a fault condition such as an under voltage lock out occurs.

If the magnitude of the voltage provided to electrode 20 ramps up and exceeds an upper or high voltage threshold established by zener diode 156, switch K1 control 166 will again be deprived of sufficient current to maintain switch K1A in the closed state. As can be seen in FIG. 4A, if K1A opens, the high voltage DC source can not be provided to electrode 20. For example, if zener 156 is a 180 VDC, 5 watt diode, then if the magnitude of the voltage appearing at node VC exceeds 180 VDC, which may occur if the arc is extinguished for some reason, zener 156 will break over. This deprives switch K1 control 166 of sufficient current to keep switch K1A closed. Establishing an upper voltage threshold via zener 156 limits the worst case power dissipation for bleeder/bias resistors 148, 150 and the voltage rating required for capacitors 128, 130, 132, and 153.

As has been shown, therefore, the preferred embodiment depicted in FIGS. 4A and 4B employs three distinct disable/lock out modes. First, high voltage power is not applied to the electrode 20 if the electrode 20 and tip 22 fail to make electrical contact. Second, if the magnitude of the voltage applied to electrode 20, after switch K1A closes, fails to achieve a low voltage threshold, switch K1A will open and remove high voltage power from electrode 20. Finally, if the magnitude of the voltage applied to electrode 20 exceeds an upper/high voltage threshold after successful arc initiation, switch K1A will also open and remove high voltage power from electrode 20.

It will be readily apparent to those skilled in the art that two separate transformers may be employed rather than the single transformer T1 shown in FIG. 4A. For example, a first transformer might be used to accomplish the power functions associated with the high voltage secondary 116 shown in FIG. 4A. Likewise, a second transformer could be used to accomplish the logic/control functions associated with the low voltage secondary 114 shown in FIG. 4A. Moreover, those skilled in the art will recognize that there are a variety of power isolation and conversion techniques that may be employed with the low voltage parts-in-place detections system of the present invention.

Figure 5:
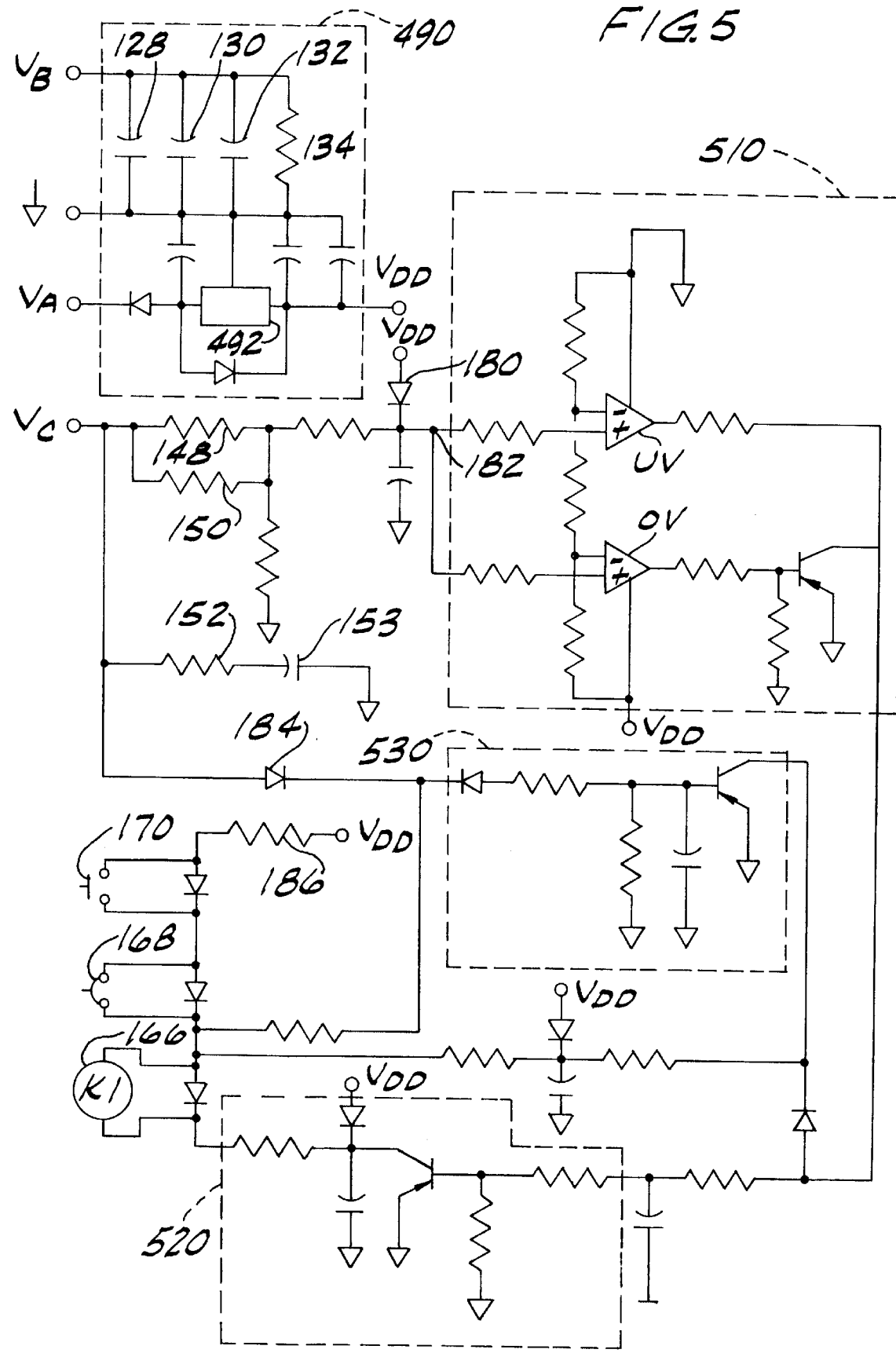
FIG. 5 is a schematic of an alternative embodiment of a switch/logic control circuit for use with the second preferred embodiment.

FIG. 5 illustrates a schematic of an alternative preferred embodiment of a switch/logic control circuit for use with a low voltage parts-in-place detection system for a contact start torch according to the second embodiment as shown in FIG. 4B. In FIG. 5, a voltage regulator circuit 490 regulates the voltage appearing at nodes VA, VB and VDD. Unlike the embodiment shown in FIG. 4A, however, in this embodiment an integrated circuit ("IC") regulator 492 is used to provide the limited low voltage DC source at node VDD.

Node VDD is connected to an input 182 of a lockout circuit 510 via a diode 182. Lockout circuit 510 is further comprised of an under voltage lockout comparator UV, and an over voltage lockout comparator OV. The output of lockout circuit 510 is connected to a first transistor switching circuit 520, and to a second transistor switching circuit 530. VDD is also connected to one side of a torch switch 170 via a resistor 186. The other side of torch switch 170 is connected to a temperature switch 168 which is, in turn, connected to node VC via a resistor 188 and a diode 184. Voltage node VC is also connected to the second transistor switching circuit 530 via a diode 184.

Switch K1 control 166 is connected the first transistor switching circuit 520. As was discussed above with regard to FIGS. 4A and 4B, switch K1 control 166 provides control over power control switches K1A and K1B.

Functionally, the purpose of the circuitry in FIG. 5 is substantially the same as that of FIGS. 4A and 4B. That is, the circuit is designed to ensure that a high voltage DC source VB is only applied to the electrode 20 after the parts-in-place detection system determines that the electrode 20 and tip 22 are properly installed. Unlike the circuit shown in FIG. 4A, however, in the embodiment of FIG. 5, switches K2A and K2B have been replaced with other circuitry, primarily transistor switching circuits 520 and 530.

Activation of the torch switch 170 by the torch operator connects node VC with the limited low voltage DC source at VDD. As discussed above with regard to FIG. 1, activation of the torch switch 170 also causes the tip 20 and electrode 22 to make temporary electrical contact. If the parts are properly in place, the first transistor switching circuit 520 will close (conduct) and allow sufficient current to flow through switch K1 control 166 to close switches K1A and K1B (see FIG. 4A). When switch K1A is closed, the high voltage DC source is applied to electrode 20 and a pilot arc is thereby established.

If, after initiation of the pilot arc, the magnitude of the voltage sensed at electrode 20 drops below a low voltage threshold (e.g., 50 V), the under voltage lockout comparator UV causes the first transistor switching circuit 520 to open. As such, switch K1 control 166 is deprived of sufficient current, and switches K1A and K1B are opened thereby removing the high voltage DC source from electrode 20. If, on the other hand, the magnitude of the voltage sensed at electrode 20 exceeds an upper voltage threshold (e.g., 180 VDC), the over voltage lockout comparator OV causes the first transistor switching circuit 520 to open. Again, if this occurs, switch K1 control 166 will be deprived of sufficient current to maintain switches K1A and K1B in the closed state, and the high voltage DC source is disconnected from electrode 20.

The switch/logic control circuit shown in FIG. 5 presents some alternatives over the approach shown in FIG. 4B. First, using comparators to accomplish the lockout function allows for better control over both the under voltage and over voltage set points. In other words, there is more precision in the lockout function. Further, the comparator circuitry is less susceptible to component variation, thus it may be more manufacturable.

An advantage that is common to both embodiments is that the under voltage lockout function allows for elimination of a minimum gas flow pressure switch common in many torches. Such a switch detects when there is insufficient gas flow in the torch and shuts down the power supply to inactivate the torch. In the detection system of the present invention, the under voltage lockout function provides this capability. Those skilled in the art will recognize that after a pilot arc is struck, insufficient gas flow results in an under voltage condition.

Those skilled in the art will further recognize that the preferred embodiments as shown in FIGS. 2–5 depict the low voltage parts-in-place detection system as used in transferred arc applications. In transferred arc operations, the arc travels from the electrode 20 to the workpiece 26 to the ground or common reference point 18. Typically, workpiece 26 is secured to the common reference point 18 by a clamp, thus ensuring electrical continuity therebetween. It should be understood, however, that the detection system of the present invention advantageously is equally applicable in non-transferred arc operations. For example, if the workpiece 26 is a piece of plexiglass, which is electrically nonconductive, it could not be connected to ground. As such, the arc generated between the electrode 20 and tip 22 could be used in the non-transferred mode to generate sufficient heat to cut or otherwise work with the plexiglass workpiece 26.

As various changes could be made in the above constructions and products without departing from the scope of the invention, it is intended that all matter contained in the above description and shown in the accompanying drawings shall be interpreted as illustrative and not in a limiting sense.

What is claimed is:

1. A detection system for a cutting torch for use in connection with a workpiece comprising:

an electrode;

a tip;

a housing supporting the tip and the electrode for providing relative movement therebetween and allowing for electrical contact between the tip and the electrode;

a sensor circuit for sensing when the electrode and the tip are in electrical contact, said sensor circuit generating a switch control signal indicative of electrical contact between the electrode and tip;

a power supply for providing a first voltage and a second voltage such that a potential voltage difference is established between the electrode and the tip or between the electrode and the workpiece, wherein a magnitude of the first voltage is less than a magnitude of the second voltage; and a first switch circuit connected to the sensor circuit, said first switch circuit applying the first voltage to the electrode when the switch control signal indicates that the electrode and the tip are not in electrical contact and said first switch circuit applying the second voltage to the electrode when the switch control signal indicates that the electrode and tip are in electrical contact.

2. The detection system of claim 1 wherein the sensor circuit further comprises a continuity circuit for detecting continuity between the electrode and the tip or between the electrode and the workpiece.

3. The detection system of claim 2 wherein the continuity circuit comprises a small resistance connected between the tip and the workpiece such that a voltage potential between the tip and the workpiece approaches zero volts whereby the potential voltage difference also approaches zero volts when the electrode and tip are in electrical contact.

4. The detection system of claim 1 wherein the sensor circuit further comprises a switch control circuit for monitoring the potential voltage difference and outputting the switch control signal when the monitored potential voltage difference indicates that the tip and electrode are in electrical contact.

5. The detection system of claim 4 wherein the switch control circuit comprises a voltage limiter for limiting the monitored potential voltage difference sensed by the switch control circuit and a logic circuit responsive to the limited, monitored potential voltage difference for outputting the switch control signal.

6. The detection system of claim 5 wherein the switch control circuit provides the switch control signal when the monitored potential voltage difference is approximately 0

VDC and removes the switch control signal when the monitored potential voltage difference thereafter exceeds a high voltage threshold whereby the first switch circuit is close circuited when the monitored potential voltage difference approaches 0 VDC and the first switch circuit is open circuited when the monitored potential voltage difference thereafter exceeds the high voltage threshold.

7. The detection system of claim 4 wherein the first switch circuit includes a first switch and wherein the switch control circuit further comprises a second switch for selectively controlling the operation of the first switch, said second switch generating the switch control signal after the electrode and tip make electrical contact thereby causing the first switch to close circuit and provide the second voltage to the electrode.

8. The detection system of claim 7 wherein the switch control circuit further comprises a monitor circuit for monitoring a voltage provided to the electrode and a lockout circuit for removing the switch control signal when a magnitude of the monitored voltage is less than a low voltage threshold thereby removing application of the second voltage from the electrode when the magnitude of the monitored voltage is less than the low voltage threshold.

9. The detection system of claim 7 wherein the switch control circuit further comprises a monitor circuit for monitoring a voltage provided to the electrode and a lockout circuit for removing the switch control signal when a magnitude of the monitored voltage exceeds a high voltage threshold thereby removing application of the second voltage from the electrode when the magnitude of the monitored voltage exceeds the high voltage threshold.

10. The detection system of claim 1 wherein the power supply further comprises a high voltage DC source selectively connected to a voltage divider network by the first switch circuit for reducing the high voltage DC source to a magnitude substantially equal to the first voltage.

11. The detection system of claim 10 wherein the first switch circuit is selectively opened and closed in response to the switch control signal to shunt the voltage divider when the switch control signal indicates that the electrode and tip are in electrical contact whereby the second voltage is connected to the electrode when the first switch circuit is close circuited and the first voltage is connected to the electrode when the first switch circuit is open circuited.

12. The detection system of claim 1 wherein the power supply further comprises a transformer for converting an AC input voltage, said transformer having a primary winding for receiving the AC input voltage, a first secondary winding for providing a source for the first voltage, and a second secondary winding for providing a source for the second voltage.

13. The detection system of claim 12 wherein the power supply further comprises a rectifier circuit for converting the source of the first secondary winding into a low voltage DC source, and a limiting circuit selectively connected to the low voltage DC source for limiting the magnitude of the low voltage DC source whereby the limited low voltage DC source provides the first voltage.

14. The detection system of claim 1 further comprising a temperature switch for sensing a temperature of the detection system whereby application of the second voltage to the electrode is inhibited when the sensed temperature exceeds a high temperature threshold.

15. The detection system of claim 1 further comprising a torch switch responsive to an operator for controlling application of power to the detection system, said torch switch inhibiting application of power to the detection system when the torch switch is not activated by the operator and not inhibiting application of power to the detection system when the torch switch is activated by the operator.

* * * * *